(12) United States Patent
Yu et al.

(10) Patent No.: US 7,373,089 B2
(45) Date of Patent: May 13, 2008

(54) METHODS AND APPARATUS FOR OPTICAL DATA TRANSMISSION OVER STANDARD FIBER

(75) Inventors: Jianjun Yu, Murray Hill, NJ (US); Keisuke Kojima, Bridgewater, NJ (US); Naresh Chand, Warren, NJ (US)

(73) Assignee: LSI Corporation, Berkeley Heights, NJ (US)

( * ) Notice: Subject to any disclaimer, the term of this patent is extended or adjusted under 35 U.S.C. 154(b) by 715 days.

(21) Appl. No.: 10/215,460

(22) Filed: Aug. 9, 2002

(65) Prior Publication Data

US 2003/0165285 A1 Sep. 4, 2003

Related U.S. Application Data

(60) Provisional application No. 60/362,589, filed on Mar. 4, 2002.

(51) Int. Cl.
*H04B 10/04* (2006.01)
*H04B 10/12* (2006.01)
(52) U.S. Cl. .................................... 398/193
(58) Field of Classification Search ............... 398/193, 398/194, 199
See application file for complete search history.

(56) References Cited

U.S. PATENT DOCUMENTS

2003/0147656 A1* 8/2003 Yano .......................... 398/186

OTHER PUBLICATIONS

A. Gnauck et al., "Dispersion Penalty Reduction Using an Optical Modulator with Adjustable Chirp", IEEE Photonics Technology Letters, V. 3, No. 10 pp. 916-918, Oct. 1991.*

J. Jeong et al., "10 Gbps Transmission Performance for Positive and Negative Chirped Transmitters with the Self-Phase Modulation Effect", IEEE Photonics Technology Letters, V. 10, No. 9, pp. 1307-1309, Sep. 1998.*

S. Kim et al., "Theoretical and Experimental Study of 10 Gbs Transmission Performance Using 1.55 um LiNbO3—Based Transmitters with Adjustable Extinction Ratio and Chirp", Journal of Lightwave Technology, V. 17, No. 8, pp. 1320-1325, Aug. 1999.*

T. Saito, "Prechirp Technique for Dispersion Compensation for a High-Speed Long-Span Transmission", IEEE Photonics Technology Letters, vol. 3, No. 1, Jan. 1991.*

(Continued)

*Primary Examiner*—Shi K. Li
(74) *Attorney, Agent, or Firm*—Michael P. Straub; Straub & Pokotylo

(57) ABSTRACT

Methods and apparatus for providing improving optical signal transmission results over standard mode fiber using a combination of negative chirp, low extinction ratio, and self-phase modulation transmission techniques in combination are described. The use of pre-transmission signal distortion in combinations with one or more of the other transmission techniques is also described. Pre-transmission signal distortion may be introduced by controlling a modulator with a large symmetric AC signal which causes the modulator to operation in a non-linear region or, alternatively, by using a relatively small non-symmetric AC signal to drive the modulator. Use of the small non-symmetric signal has the advantage of reduced power requirements. The pre-transmission distortion acts to counter some of the distortion introduced by the transmission of the signal over an optic fiber.

15 Claims, 14 Drawing Sheets

OTHER PUBLICATIONS

P. Kuindersma et al., "Packaged, Integrated DBF/EA-MOD for Repeaterless Transmission of 10Gbit/s Over 107 km Standard Fibre", Electronic Letters, V. 29, No. 21, pp. 1876-1878, Oct. 14, 1993.

Y. Park et al., "Dispersion-Penalty-Free Transmission Over 130-km Standard Fiber Using a 1.55-μm, 1—Gb/s Integrated EA/DFB Laser with Low-Extinction Ratio and Negative Chirp", IEEE Photonics Technology Letters, V. 8, No. 9, pp. 1255-1257, Sep. 1996.

J. Jeong et al., "10-Gb/s Transmission Performance for Positive-and Negative-Chirped Transmitters with the Self-Phase Modulation Effect", IEEE Photonics Technology Letters, V. 10, No. 9, pp. 1307-1309, Sep. 1998.

S. Kim et al., "Theoretical and Experimental Study of 10 Gb/s Transmission Performance Using 1.55μm $LiNbO_3$-Based Transmitters with Adjustable Extinction Ratio and Chirp", Journal of Lightwave Technology, V. 17, No. 8, pp. 1320-1325, Aug. 1999.

* cited by examiner

METHODS AND APPARATUS FOR OPTICAL DATA TRANSMISSION OVER STANDARD FIBER

RELATED APPLICATIONS

This application claims the benefit of the filing date of U.S. Provisional Patent Application Ser. No. 60/362,589 filed Mar. 4, 2002.

FIELD OF THE INVENTION

The present invention is directed to optical data transmission, and more particularly, to methods and apparatus for implementing high-speed optical transmissions over standard optical fiber.

BACKGROUND OF THE INVENTION

Communication systems use transmission mediums, e.g., optical fiber, to transmit a signal, e.g., light, which conveys data. The data may correspond to a speech signal or other information. In optical networks Standard Single Mode Fiber (SSMF) is one transmission medium that is used in the art. As data signals are transmitted through SSMF, signal attenuation due to noise and characteristics of the medium, e.g., group-velocity dispersion (GVD), limits the distance a signal can travel. Therefore, one technique used to transmit data across a large distance is to use devices that overcome the dispersion limitation. Using these devices, several SSMFs can be coupled together to traverse the large distance.

In theory any distance can be traversed by using an appropriate number of repeater devices and SSMFs, but these devices add complexity and cost to a communication system. Therefore in order to lower the number of repeater device needed in a system, techniques for increasing the transmission distance of SSMF have been developed.

A first known technique for lengthening the transmission distance of SSMF includes using negative chirp. See, e.g., A. H. Gnauck, S. K. Korotky, J. J. Veselka, J. Nagel, C. T. Kemmerer, W. J. Minford, and D. T. Moser, *Dispersion Penalty Reduction Using an Optical Modulator with Adjustable Chirp*, IEEE Photon. Technol. Lett., vol. 3, No. 10, pp. 916-918 (1991). Another known technique includes Adjusting extinction ratio (ER). The former works alone. The latter works only when combined with the former. See, e.g., Y. K. Park, T. V. Nguyen, P. A. Morton, J. E. Johnson, O. Mizuhara, J. Jeong, L. D. Tzeng, P. D. Yeates, T. Fullowan, P. F. Sciortino, A. M. Sergent, W. T. Tsang, and R. D. Yadvish, *Dispersion-penalty Free Transmission Over 130 km Standard Fiber Using a 1.55 μm 10 Gb/s Integrated EA/DFB Laser With Low-extinction Ratio and Negative Chirp*, IEEE Photon. Technol. Lett., Vol. 8, No. 9, pp. 1255-1257 (1996) which is hereby expressly incorporated by reference.

A third technique for achieving a long transmission distance on SSMF is self phase modulation (SPM). SPM involves relying on the inherent fiber characteristics in combination with the input power level to provide suitable phase modulation. The use of self-phase modulation in combination with negative chip has been shown to be beneficial. See, J. Jeong, Y. K. Park, S. K. Kim and T. V. Nguyen, O. Mizuhara and T. W. Oh, *10 Gb/s Transmission Performance For Positive-And Negative-Chirped Transmitters With the Self-Phase Modulation Effect*, IEEE Photon. Technol. Letter, Vol. 10, No. 9, pp. 1307-1309 (1998) which is hereby expressly incorporated by reference.

Given the complexity of optical transmission systems it is often difficult to predict the effect of using various transmission techniques in combination on overall transmission results. A technique which improves transmission results in one combination may degrade transmission results when used in another combination.

The first (i.e., negative chirp) and the third (i.e., SPM) of the above discussed three techniques for improving optical transmission distances have been shown to work alone. From the above discussed papers it is known that the use of negative chirp in combination with adjusting the ER or SPM can improve transmission results. However, what the effect of using negative chip, adjusting the ER and using SPM in combination is not known or inherently obvious from the above cited papers.

In view of the above discussion, it is apparent that there is a need for improved methods and apparatus for increasing transmission distances over transmission mediums, e.g., SSMF. It is desirable that such techniques produce predictable results. In addition, from a cost perspective, it is desirable that at least some of the techniques be relatively easy to implement in terms of hardware.

SUMMARY OF THE INVENTION

The present invention is directed to methods and apparatus for implementing high-speed optical transmissions over standard optical fiber. In particular the present invention is directed to methods and apparatus for improving optical signal transmission results over standard mode fiber using a combination of low extinction ratio, negative chirp and self-phase modulation transmission techniques.

The use of pre-transmission signal distortion in combination with one or more of the other transmission techniques is also described. Pre-transmission signal distortion may be introduced by controlling amplifying the data signal in a symmetric manner to create a relatively large AC electrical data signal that is then used to control an optical modulator. The large symmetric AC modulation signal causes the modulator to operate in a non-linear region thereby intentionally distorting the data signal to be transmitted prior to transmission over the Standard Single Mode Fiber as an optical signal. This can be easily achieved by shifting the bias voltage away from the quadrature point which is used in conventional modulation schemes. Alternatively, the data signal to be transmitted is subjected to non-linear electrical amplification prior to being used as a modulator input signal. In the embodiment where non-linear electrical amplification is used, a relatively small non-symmetric AC signal is generated to drive the modulator. The non-linear electrical amplifier serves to intentionally pre-distort the data signal to be transmitted prior to conversion into an optical signal by use of the modulator. Use of the small non-symmetric signal has the advantage of reduced power requirements as compared to the embodiment where a large AC signal is used to drive the modulator. In both embodiments, the pre-transmission distortion introduced either by the electrical amplifier or the modulator operating in a non-linear manner can be beneficial.

The pre-transmission distortion, referred to elsewhere in the application as "pre-distortion" for the purposes of brevity, acts to counter some of the distortion introduced by the transmission of the signal over an optic fiber thereby permitting longer transmission distances to be achieved without the need for repeaters.

The methods and apparatus of the present invention are particularly well suited when transmitting data at bit rates of about 10 Gb/s, e.g., data rates in the range of 9.9532 GB/s to and including 10.72 GB/s.

Numerous additional features, benefits and details of the methods and apparatus of the present invention are described in the detailed description which follows.

DETAILED DESCRIPTION

Figure 1:
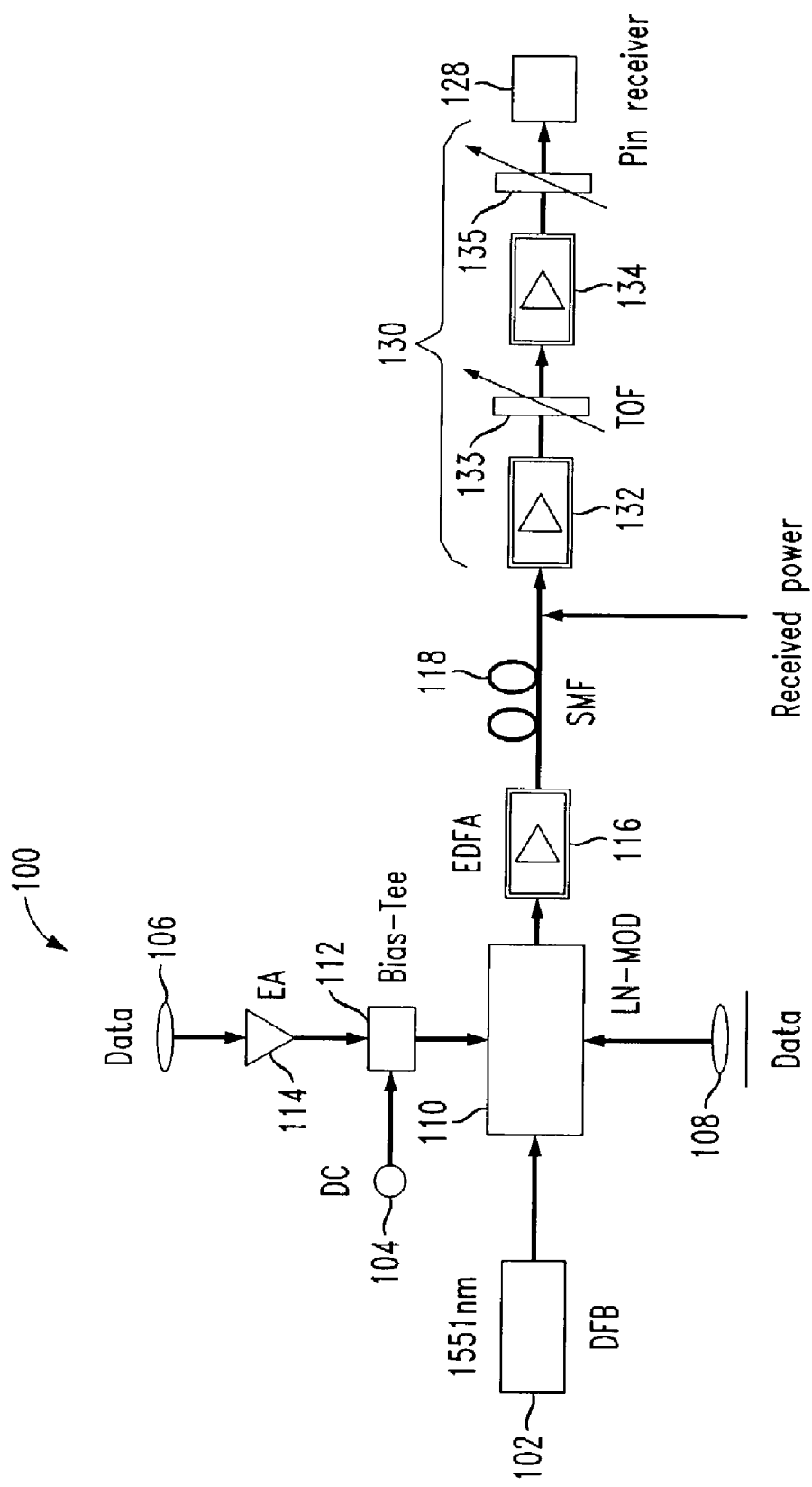
FIG. 1 illustrates a first communication system embodiment implemented in accordance with the present invention.

FIG. 1 illustrates a communication system 100 implemented in accordance with one embodiment of the invention. The communication system 100 includes a distributed feedback diode laser (DFB-DL) 102, a dual-drive LiNbO$_3$, e.g., Nach-Zehnder, modulator 110, electrical signal generators 106, 108, an electrical amplifier (EA) 114, a DC source 104, a bias-tee 112, an erbium doped fiber amplifier (EDFA) 116a, Standard Single Mode Fiber (SSMF) 118, a tunable optical filter (TOF) 130 and a pin receiver 128. The various elements of the system 100 are coupled together as shown in FIG. 1. the TOF 130 is implemented as a two stage device. The TOF 130 includes a first stage comprising a first optical amplifier 132 followed by a first optical filter 133. A second stage comprising a second optical amplifier 134 and a second optical filter 135 follows the first stage. The output of the second optical filter 135 serves as the output of the TOF 130 and is coupled to the input of PIN receiver 128. Various experimental results obtained using the communication system 100 will be used and discussed below to explain various features and benefits of the present invention.

Figure 2:
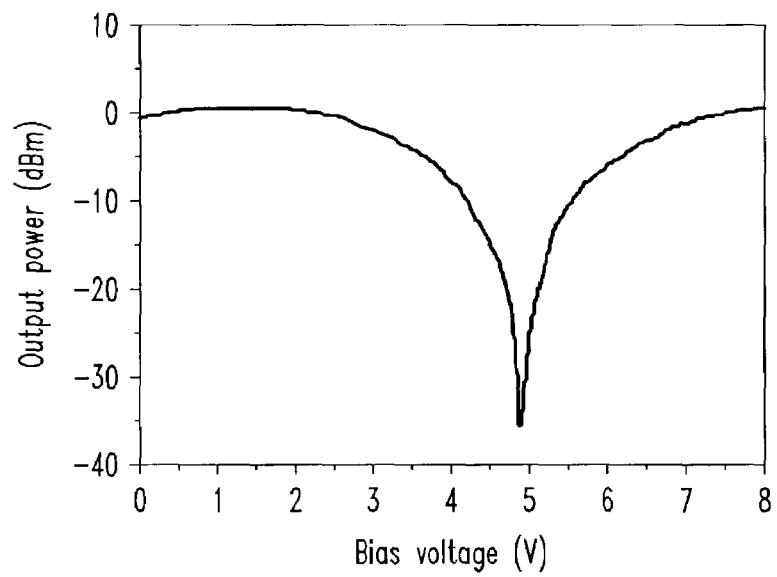
FIG. 2 illustrates the transmission characteristic of the modulator shown in FIG. 1.

The DFB-DL 102 outputs a continuous wave (CW) lightwave having a wavelength of 1551 nm. The lightwave is modulated with a linear 10 Gbit/s non-return to zero (NRZ) pseudorandom bit stream (PRBS) of length $2^{31}-1$, generated by data source 106, using the dual-drive LiNbO$_3$ modulator 110. This "Push-pull" LiNbO$_3$ modulator 110 is a promising candidate for the present invention because the extinction ratio (ER) and chirp of the generated optical signal can be independently adjusted. The insertion loss of this exemplary modulator 110 is 4.8 dB, and its transmission characteristic is shown in FIG. 2. Before entering the modulator 110, the 10 Gbit/s electrical signal generated by the pattern generator 106 is amplified by the EA 114. In one exemplary embodiment the amplified 10 Gbit/s electrical signal is 4.5V (peak-to-peak). As will be discussed later, the EA 114 may be used in some embodiments of the invention to implement a signal distortion operation used to pre-distort the optical signal to be transmitted over SMF 118.

The ER of the modulated signal can be manipulated by adjusting the bias voltage by controlling the DC source 104 which generates the DC bias signal supplied to the bias-tee 112. For example, in one embodiment when the bias voltage is 3.7V, the ER of the modulated signal is 12.8 dB and when the bias voltage is 2.8V, the ER is 6 dB. ERs smaller than 10 dB may be considered low. Accordingly, and ER of 6 dB is an example of a low ER. In order to obtain these exemplary signal values, the ER of the modulated signal was measured by a digital communications analyzer (DCA) after passing a SONET filter designed for 10 Gbit/s NRZ signals.

In various exemplary implementations used for testing, the chirp parameter of the modulated signal for the exemplary experimental system 100 was set to a negative value, e.g., −1. Such a negative chirp parameter was chosen because it is suitable for long distance transmission and can be easily obtained. In various implementations where the dual-drive LiNbO$_3$ Nach-Zehnder modulator 110 was driven single-endedly, i.e., data source 108 was turned off, the chirp was set to −1. In other embodiments, the chirp amount was adjusted by using the second data source 108 to control the amount of negative chip that was used.

The modulated signal, generated by modulator 110, is amplified by the EDFA 116 before it is transmitted over the SSMF 118. The EDFA 116 is used to adjust the amount of SPM that occurs. The amount of SPM is controlled by controlling the optical power of the signal input to the fiber 118.

Whether SPM will take effect, depends on two parameters: one is dispersion length $L_D$, another one is nonlinear length $L_{NL}$. Fiber nonlinear length $L_{NL}$ is defined as:

$$L_{NL} = \frac{1}{\gamma P_0};$$

where $\gamma$ is nonlinear coefficient and $P_0$ is the input power. Larger the input power, the smaller fiber nonlinear length; which the nonlinear in the fiber is larger.

Fiber dispersion length $L_D$ is defined as:

$$L_D = \frac{2\pi c T_0^2}{|\lambda^2 D|};$$

where C is the optical speed, $T_0$ is pulse width, $\lambda$ is optical wavelength, D is chromatic parameter.

If $L_{NL} \gg L_D$, the nonlinear effect is small, the signal only suffer from the dispersion effect, there is no SPM. If $L_{NL}$ is near $L_D$ the signal will suffer from both dispersion and SPM. If $L_{NL} \ll L_D$, the signal will mainly suffer from SPM.

For a standard single mode fiber, e.g., fiber 118, once the input power is larger than 3 dBm, SPM will take effect. By controlling the optical power of the signal supplied to fiber 118, EDFA 116 permits control of SPM. In various embodiments, to insure the use of SPM, the input optical input power to fiber 118 is maintained above 3 dBm by the EDFA 116.

In the exemplary system of FIG. 1, the loss of the exemplary SSMF 118 was 0.21 dB/km and dispersion was 17 ps/nm/km at 1550 nm. After transmission through the SSMF 118, the signal is passed through the two level tunable optical filter (TOF) 130 to suppress the amplified spontaneous emission (ASE) noise characteristic common in EDFAs such as EDFA 116. The TOF 130 used in the exemplary experimental setup had a bandwidth of 1.4 nm. In the FIG. 1 system, the transmitted optical signal is received by the PIN diode receiver 128 after processing by TOF 130.

Figure 3:
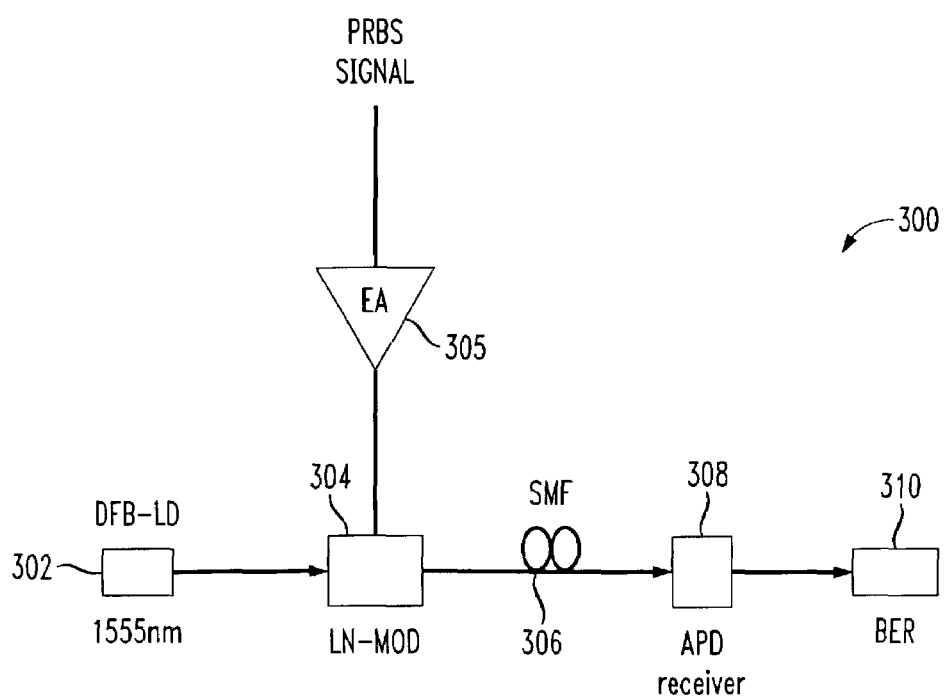
FIG. 3 illustrates a second communication system embodiment implemented in accordance with the present invention.

FIG. 3 illustrates a second exemplary communication system 300 implemented in accordance with a second exemplary embodiment of the invention. Communication system 300 includes a DFB-LD 302, a LN modulator 304, an amplifier 305, a SSMF 306, an avalanche photodiode (APD) receiver 308 and a bit error rate (BER) analyzer 310 coupled together as shown. Experimental results obtained from system 300 will be used to explain various features and benefits of the invention.

The exemplary DFB-LD 302 used to obtain experimental results had an output power of 16.5 dBm at a wavelength of 1555 nm. A $2^{31}-1$ PRBS pseudorandom bit stream signal that is amplified typically to 3.4 Vpp (peak-to-peak) by EOA 305 drives the LN modulator 304. Different pp values are used in different embodiments. In the FIG. 3 example, the LN modulator 304 has a chirp parameter of −0.7 (Z-cut and single drive). Depending on the DC bias of LN modulator 304, the modulated signal after the LN modulator 304 will be in the range of 9-10 dBm. After repeaterless transmission over SSMF 306 and without any dispersion compensation, the signal is received by a high sensitivity APD 308 receiver. Use of the APD 308 in place of the less expensive pin diode receiver 128 helps eliminate the need for amplification provided by TOF in the FIG. 1 system. BER analyzer 310 is used to obtain test results from the system 300. The insertion loss and dispersion at 1550 nm of the SSMF 306, in the FIG. 3 experimental system was 0.21 dB/km and 17 ps/nm/km, respectively.

Several features of the communications techniques of the present invention implemented using the systems of FIGS. 1 and 3 will now be discussed. Experimental results obtained using the systems 100, 200 will also discussed to show the benefits of the various different transmission techniques, and combinations thereof, used in accordance with the present invention.

Figure 4:
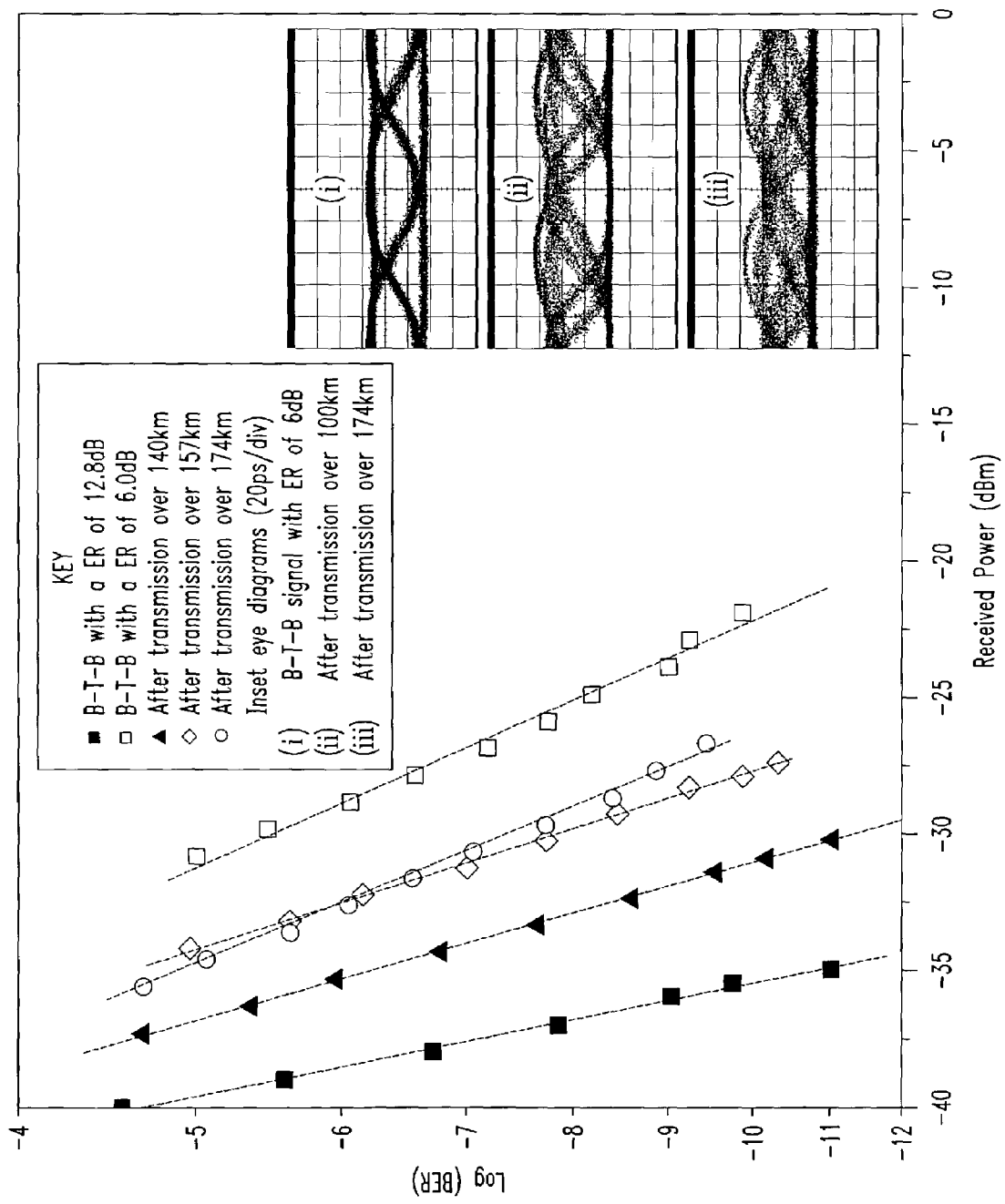
FIG. 4 is a BER versus received power graph illustrating the benefits of low ER.

FIG. 4 illustrates the effect of using different ERs when transmitting a signal over various lengths of fiber using negative chirp without the benefit of SPM in the experimental system 100 shown in FIG. 1. In particular, FIG. 4 illustrates the BER (burst error rate) achieved using communication system 100 under the various experimental conditions discussed below. When obtaining the FIG. 4 results, the modulator 110 was driven single-endedly to produce a chirp of −1.

To obtain the results shown in FIG. 4, the input power into the fiber was fixed at 10 dBm and the ERs for the transmission distance of 140, 157 and 174 KM were optimized to be 6.7, 6 and 5.3 dB, respectively. As we have mentioned the ER is changed by adjusting the bias voltage into bias tee 112. ERs of 6.7, 6 and 5.3 dB were obtained when the bias voltage biases were chosen as 2.8, 2.7 and 2.6V, respectively. After the signal is transmitted over 140 KM, the penalties of the transmitted signal are −8 and 4 dB relative to the B-T-B signal with an ER of 6 and 12.8 dB, respectively. The signal after transmission over 140 km was measured over 24 hours and resulted in a BER smaller than $10^{-14}$. After the signal is transmitted over 157 and 174 km, the power penalty of the transmitted signal is −5 and −3.5 dB, respectively, relative to the BTB signal with an ER of 6 dB. No error-floor at a BER smaller than $10^{-9}$ is observed after transmission over 174 km. Electrical eye diagrams (i), (ii) and (iii) are included in FIG. 4. (i) shows the B-T-B signal with an ER of 6 db. (ii) shows the resulting electrical signal after transmission over 100 km. (iii) shows the resulting electrical signal after transmission over 174 km.

Figure 5:
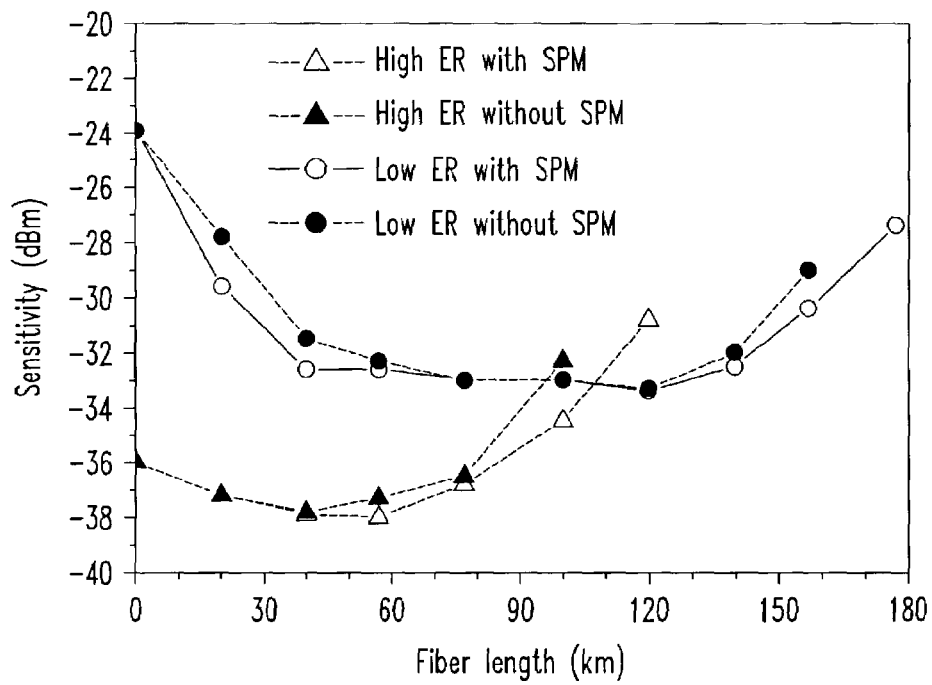
FIG. 5 is a sensitivity versus fiber length graph illustrating the benefits of SPM and low ER for different fiber lengths.

FIG. 5 illustrates receiver sensitivity for various transmission distances for four input configurations that show how negative chirp, low ER, and SPM, when used in combination in accordance with the invention, can improve optical transmission results. These results were obtained from communication system 100. The white circles represent tests with a fixed low ER (6 dB) and with SPM, the shaded circles represent tests with a fixed low ER (6 dB) and without SPM. Instead of using a fixed ER, as mentioned earlier, the receiver sensitivity can be improved by optimizing the ER for different transmission distances. For simplicity, most of the experimental results were obtained using a fixed ER. At longer fiber lengths to avoid error-floor at the BER of $10^{-9}$ ER may be lowered. The back-to-back (B-T-B) receiver sensitivity for the case with a low ER (6 dB) is −23.9 dB. As shown in FIG. 3, after transmission through the SSMF 118 the signal performance is initially improved over the B-T-B case for both configurations because of negative chirp. Receiver sensitivity is highest after transmission over 57 km. From 57 to 120 km, the receiver sensitivity remains fairly constant whether SPM is considered or not.

At 157 km, if SPM is not considered, the BER will be error-floor at $10^{-9}$, even when the ER is slightly lowered to optimize the ER with the transmission distance. With the help of SPM and adjusting the input signal with an ER of 5.3 dB, there is no error floor at a BER smaller than $10^{-9}$ for signal transmissions over 174 km.

The white triangles represent tests with a fixed high ER (12.8 dB) and with SPM, the shaded triangles represent tests with a fixed high ER (12.8 dB) and without SPM. With high ER, the receiver sensitivity for a B-T-B signal is very high, and receiver sensitivity initially improves as the fiber length increases because of negative chirp. Without SPM, the signal will be error-floored after transmission over 120 km (assuming an error floor $10^{-9}$). When the input power is 10 dBm, thereby achieving SPM, the maximum transmission distance is increased and there is no error floor with a BER smaller than $10^{-9}$ after transmission over 120 km. However, after transmission over 130 km, there will be error-floor at the BER of $10^{-9}$. Therefore, this experiment shows that superior results for long distance transmissions can be obtained using a combination of negative chirp, low ER, and SPM in accordance with one feature of the present invention.

Figure 6:
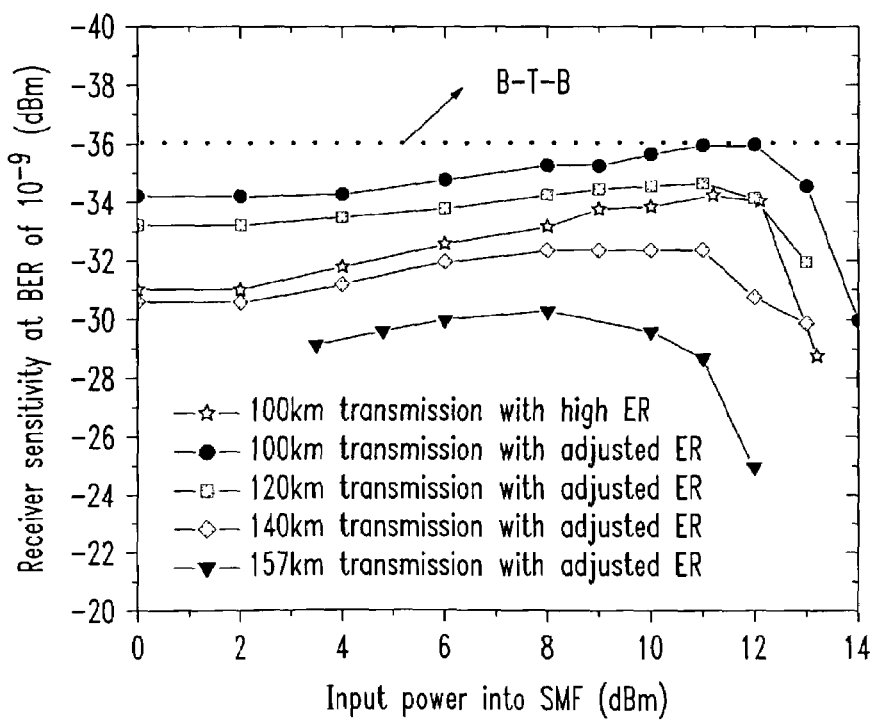
FIG. 6 is a receiver sensitivity versus input power graph illustrating the benefits of SPM for different fiber lengths and using an optimized ER.

FIG. 6 illustrates the results of another experiment using the communication system 100 of FIG. 1 that further shows the benefits of using SPM with negative chirp and low ER. This experiment measures receiver sensitivity as a function of input power into the SSMF 118. Different fiber lengths are tested and the ER is optimized for each fiber length with the exception of the 100 km results where a high ER is used. FIG. 6 clearly shows higher receiver sensitivity with the use of SPM. FIG. 6 also shows that there is an input power level for each fiber length that optimizes the benefits of SPM. When input power greater than the optimum level is used, receiver sensitivity decreases. According to the FIG. 6 results, when input power is optimized, the improved penalty is 1.8, 1.5, 1.3 and 1.3 dB for the transmission distances of 100, 120, 140 and 157 km, respectively. Thus, the illustrated results show that by applying an optimum input power level for a given fiber distance as done in accordance with various embodiments to optimize the SPM, under such conditions, SPM can improve transmission results.

By optimizing the ER used in combination with SPM, and from the above discussed experimental results, two trends were noticed by the inventors. First, the longer the transmission distance the lower the optimized ER of the input signal should be and, second, the longer the transmission distance, the smaller the optimized input power for SPM should be.

As an alternative to SPM or in addition to SPM, signal pre-distortion may be used in accordance with the present invention to improve transmission distances. Such signal pre-distortion attempts to counter anticipated signal distortions that will be introduced as a result of signal transmission. In various embodiments, the pre-distortion is performed on the electrical signal prior to its being converted to an optical signal for transmission over a fiber optic cable.

First, one method for implementing signal pre-distortion will be discussed. Then, experimental results obtained using the first signal pre-distortion technique will be compared with results obtained when the input signal is not pre-distorted. Then, a second method for implementing signal pre-distortion in accordance with the invention will be described and compared with the first method.

Figure 7:
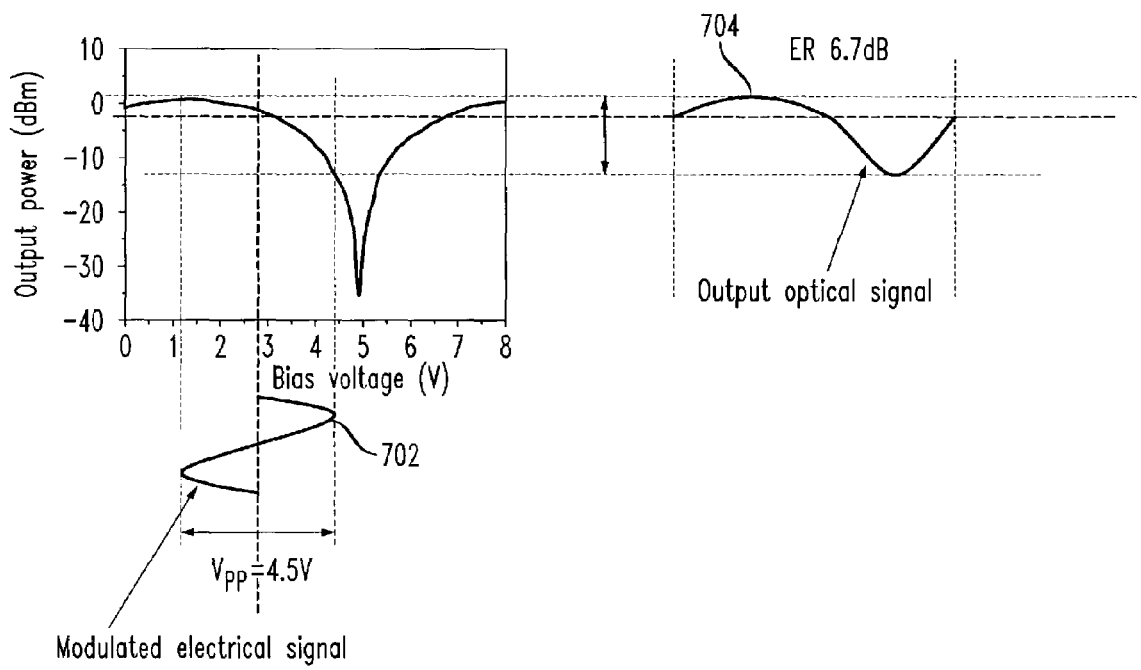
FIG. 7 illustrates obtaining a pre-distorted optical signal using a high amplitude electrical signal in accordance with the invention.

FIG. 7 illustrates how a pre-distorted modulated signal is obtained from a high amplitude, e.g., 4.5 $V_{pp}$ electrical signal 702. The electrical signal 702 with a voltage of 4.5 $V_{pp}$ and a DC bias of approximately 2.75V drives modulator 110 to produce a pre-transmission distorted optical signal 704. As shown in FIG. 7, the high peak to peak (PP) input voltage allows the modulator 110 to partially operate in a non-linear region of its transmission characteristic, e.g., a nonlinear portion of its transfer function is used. The non-linear operation of the modulator 110 creates the pre-distortion of the first half of the optical output signal 704. The eye diagram of FIG. 8 further illustrates the pre-distortion.

Figure 8:
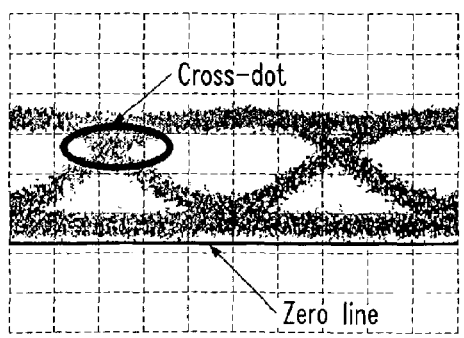
FIG. 8 illustrates an eye diagram for the pre-distorted optical signal of FIG. 7.
Figure 9:
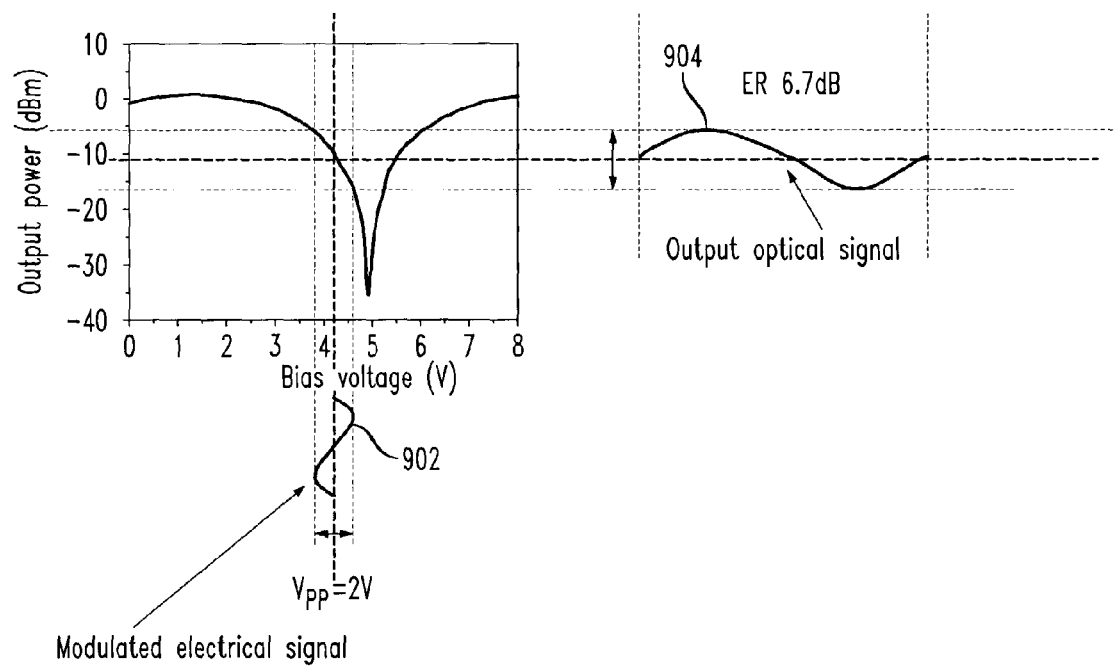
FIG. 9 illustrates a non pre-distorted optical signal when the modulator of FIG. 1 is driven by a small amplitude electrical signal.
Figure 10:
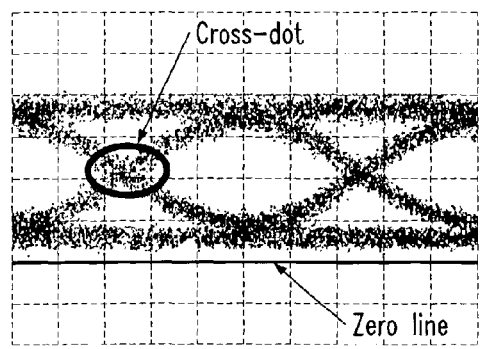
FIG. 10 illustrates an eye diagram for the non pre-distorted optical signal of FIG. 9.

For comparison purposes, FIG. 9 shows the case where the signal is not pre-distorted as done in various embodiments of the invention. FIG. 9 illustrates a 2 $V_{pp}$ electrical signal 902 that drives modulator 110 to produce an optical signal 904. In this case the electrical voltage is DC biased to 4.25 volts and is small enough to allow the modulator 110 to operate in a linear region of its transmission characteristic, e.g., a region where the modulator's transfer function is linear. Therefore, signal pre-distortion does not occur. FIG. 10 illustrates the measured eye diagram of the modulated signal and, in contrast to the FIG. 8 diagram, shows no signal distortion.

Figure 11:
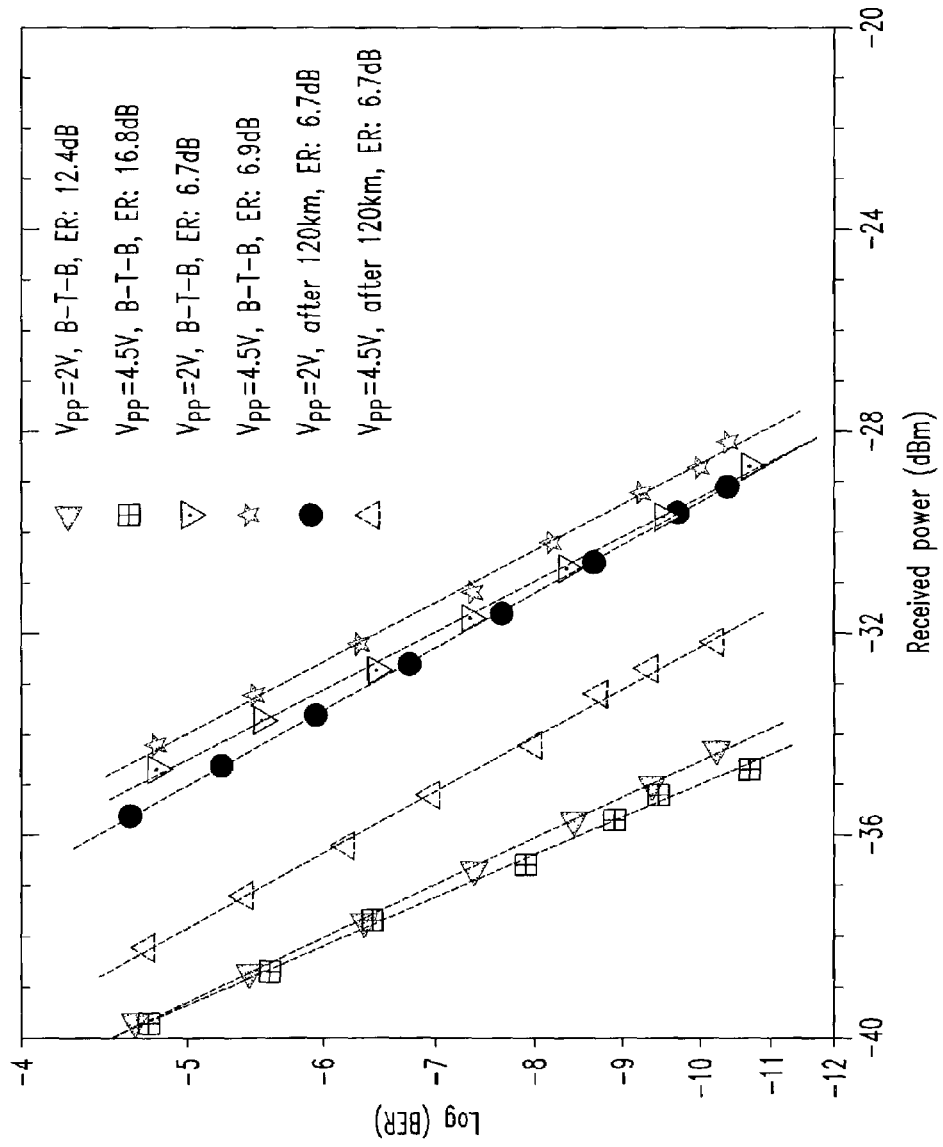
FIG. 11 is a BER versus received power graph illustrating the benefits of transmitting a pre-distorted optical signal in accordance with the invention.

Using the first embodiment 100 of the present invention, experiments were performed to demonstrate the benefits of using signal pre-distortion with the techniques already described, e.g., a combination of low ER, negative chirp, and SPM. FIG. 11 illustrates the BER performance measured in communication system 100 when a modulated electrical signal with a large voltage $V_{pp}$=4.5V and 2.75 V DC bias voltage is used for various fiber length resulting in pre-transmission distortion of the signal. It also illustrates when a small voltage $V_{pp}$=2V and a DC bias voltage of 4.25 volts is used for various fiber lengths resulting in a signal which is not subjected to pre-transmission distortion. As mentioned previously, negative chirp is implemented by driving modulator 110 single endedly. From FIG. 11, at a BER of $10^{-9}$, the receiver sensitivities for a signal with high ER and before transmission are −35.7 and −35.4 dBm, respectively.

Receiver sensitivities at a BER of $10^{-9}$ with a low ER and before transmission are −29.4 dBm, for an input signal with $V_{pp}$=4.5V, and −30.2 dBm, for an input signal with $V_{pp}$=2.0V. Since the large voltage of the 4.5 $V_{pp}$ signal creates signal pre-distortion, receiver sensitivity before transmission, e.g., measured at the output of the modulator, is lower then the input signal with the smaller voltage.

FIG. 11 also illustrates the BER performance of a 4.5 $V_{pp}$ signal with small ER and a 2.0 $V_{pp}$ signal with small ER after transmission over a 120 km SSMF. At least some of the distortions introduced during transmission counter the pre-transmission distortions that were intentionally introduced into the signal. The FIG. 11 results show the benefits of using signal pre-distortion. At a BER of $10^{-9}$ the receiver sensitivities of the modulated signal with $V_{PP}$=4.5V and $V_{PP}$=2V are −33.4 and −30.5 dBm, respectively. Thus, the exemplary results show that when a large voltage input signal is used, causing desirable pre-transmission signal distortion, a 2.9 dB receiver sensitivity improvement over a smaller non-distorting voltage input can be achieved.

Figure 12:
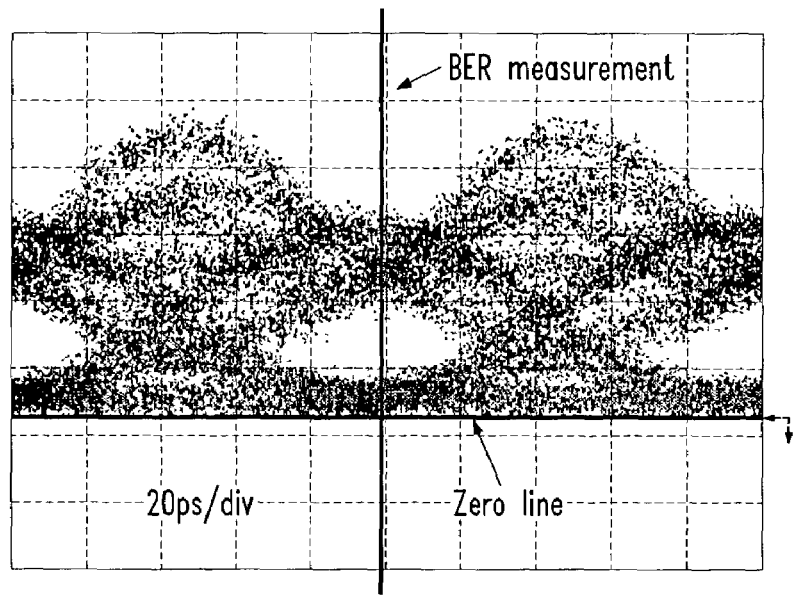
FIG. 12 illustrates an eye diagram of a pre-distorted signal after transmission.
Figure 13:
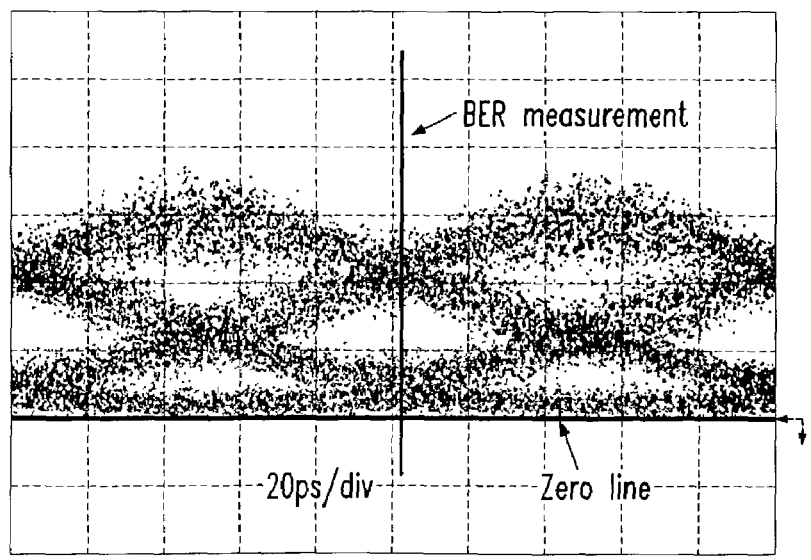
FIG. 13 illustrates an eye diagram of a non pre-distorted signal after transmission.

FIGS. 12 and 13 illustrate eye diagrams after transmission over a 120 km distance for a 4.5 $V_{pp}$ and a 2.0 $V_{pp}$ input signal, respectively. It is clearly seen that the eye diagram of FIG. 12 is more open, the fluctuation of "0"s is smaller and ER is higher. In FIG. 12, 20 ps/div means 20 pico-seconds per division in X-axis in the eye diagram.

Figure 14:
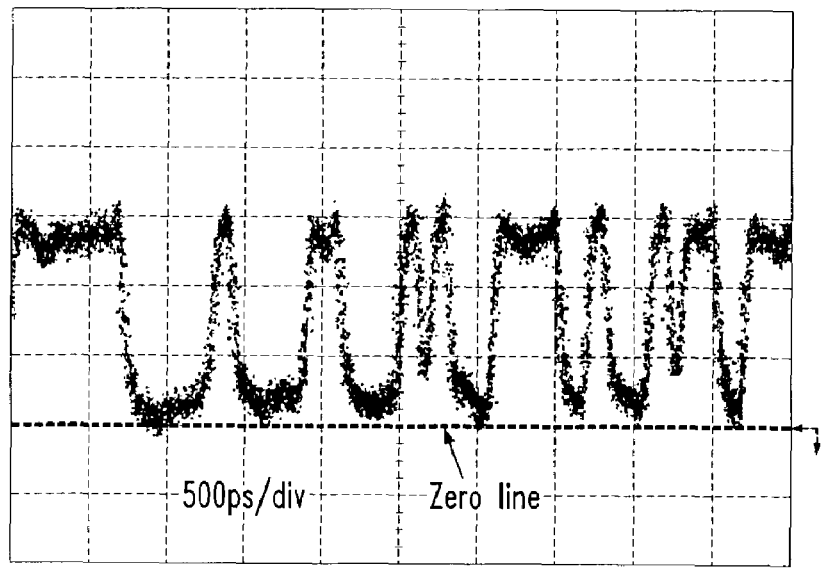
FIG. 14 illustrates an input signal waveform to the system of FIG. 1.
Figure 15:
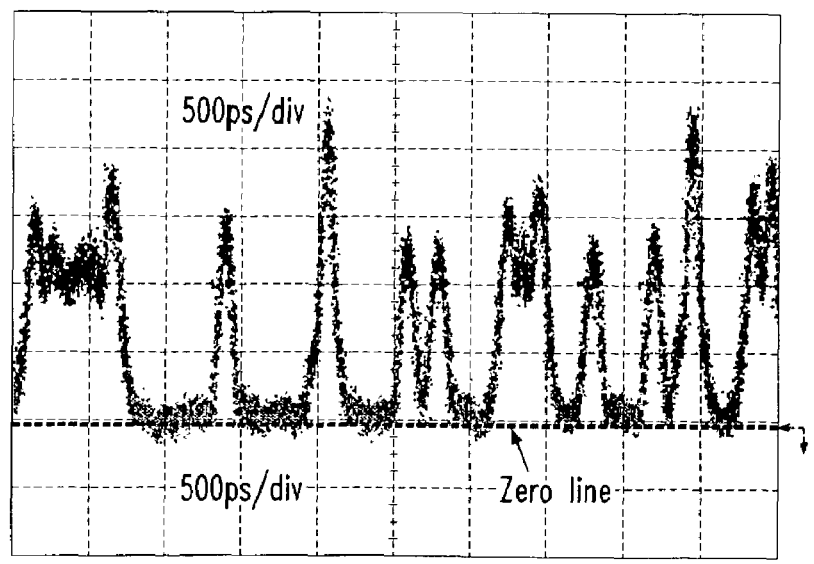
FIG. 15 illustrates a large amplitude signal waveform after transmission through the system of FIG. 1.
Figure 16:
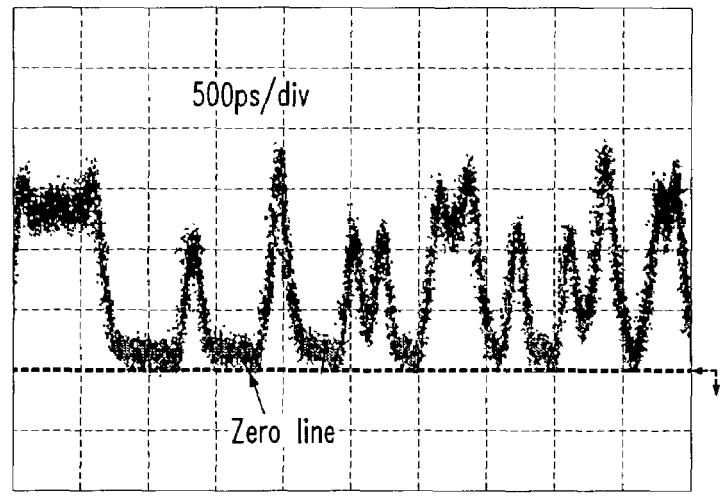
FIG. 16 illustrates a small amplitude signal waveform after transmission through the system of FIG. 1.

In order to make a more detailed investigation, an experiment involving the measuring of waveforms was performed. For this experiment, the signal was modulated by a PRBS of $2^7-1$ because of the trigger limitation of the sampling oscilloscope. FIG. 14 illustrates an input waveform before transmission. FIG. 15 illustrates the results of using a large electrical signal which causes pre-transmission signal distortion, after transmission over a 120 km SSMF. FIG. 16 illustrates the results of using a small electrical signal, which does not cause pre-transmission signal distortion, after transmission over a 120 km SSMF.

By comparing FIGS. 15 and 16, it can be observed that the fluctuation of "0"s is smaller and ER is larger in the case of a large electrical signal which causes intentional pre-transmission signal distortion. Therefore the receiver sensitivity is much higher for the FIG. 15 case. Inter-symbol interfere (ISI) is greater in the FIG. 15 case when two consecutive "1"s are transmitted. However, the judging time for BER measurement is far away from the time that the maximum ISI is happening. Therefore the strong ISI is not likely to have a large effect on BER measurement.

Figure 17:
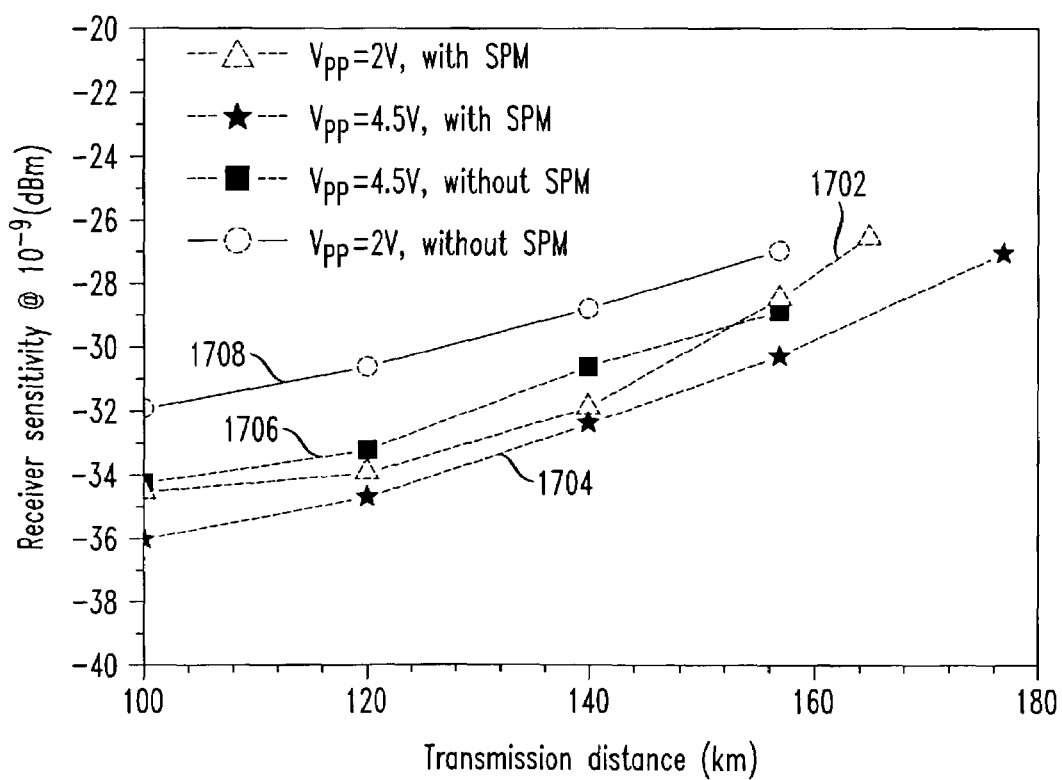
FIG. 17 is a receiver sensitivity versus transmission distance graph illustrating the benefits of using signal pre-distortion and SPM.

A third experiment is performed, measuring receiver sensitivity at different transmission distances for the communication system 100 of FIG. 1 when SPM was used in combination with signal pre-distortion, low ER and negative chirp. FIG. 17 illustrates the results for this experiment. Negative chirp and optimized ERs are used for each case. In this experiment, as shown in FIG. 17, four cases are investigated: (1) low voltage input (no distortion) with SPM (see triangles) 1702, (2) high voltage input (pre-distortion) with SPM (see stars) 1704, (3) high voltage input without SPM (see squares) 1706 and (4) low voltage input without SPM (see circles) 1708. The results demonstrate the benefits of SPM and signal pre-distortion used in combination with negative chirp and low ER.

Referring to FIG. 17, without considering SPM, i.e., comparing curves 1706 and 1708, over 2 dB receiver sensitivity can be realized by using a high voltage input 4.5 Vpp which causes pre-transmission signal distortion, over a smaller input voltage 2.0 Vpp. Results for curves 1706 and 1708 stop at a transmission distance of 157 km. This is because, in order to obtain BER measurements at distances beyond 157 km, input power would have to be raised to a point where a small amount of SPM occurs.

When SPM is considered, i.e., curves 1702 and 1704 are compared, input power is optimized for the different transmission distances to achieve the best results from SPM. FIG. 17 shows that the best results are obtained in case 2, when a high voltage input is used with SPM. The maximum transmission distances for the two cases with $V_{PP}=2V$ and $V_{PP}=4.5V$ are 165 and 177 km, respectively.

Now an alternative method for obtaining a pre-distorted optical signal will be described. In the previous technique a signal which was symmetric around the bias voltage was used. This is not the case in this alternative pre-transmission signal distortion embodiment.

Since power consumption can be very important in a real optical transmission system, signal pre-distortion generated by a large amplitude electrical signal may not be the best option even though it is relatively easy to implement given that generation of symmetric waves, e.g., sine waves, is easy to achieve. In the alternative method for pre-distorting an optical signal, a distorted, e.g., non symmetric, electrical signal with a small amplitude is used. Power consumption savings can be, and in some embodiments is, up to 20% by using this alternative method as compared to the method which uses a large PP voltage to achieve the desired distortion. Test results demonstrating that a pre-distorted signal obtained by using a distorted electrical signal with a small amplitude can be just as effective as using a pre-distorted signal obtained by using an electrical signal with a large amplitude. Such results were obtained using the exemplary system 300 shown in FIG. 3.

Figure 18:
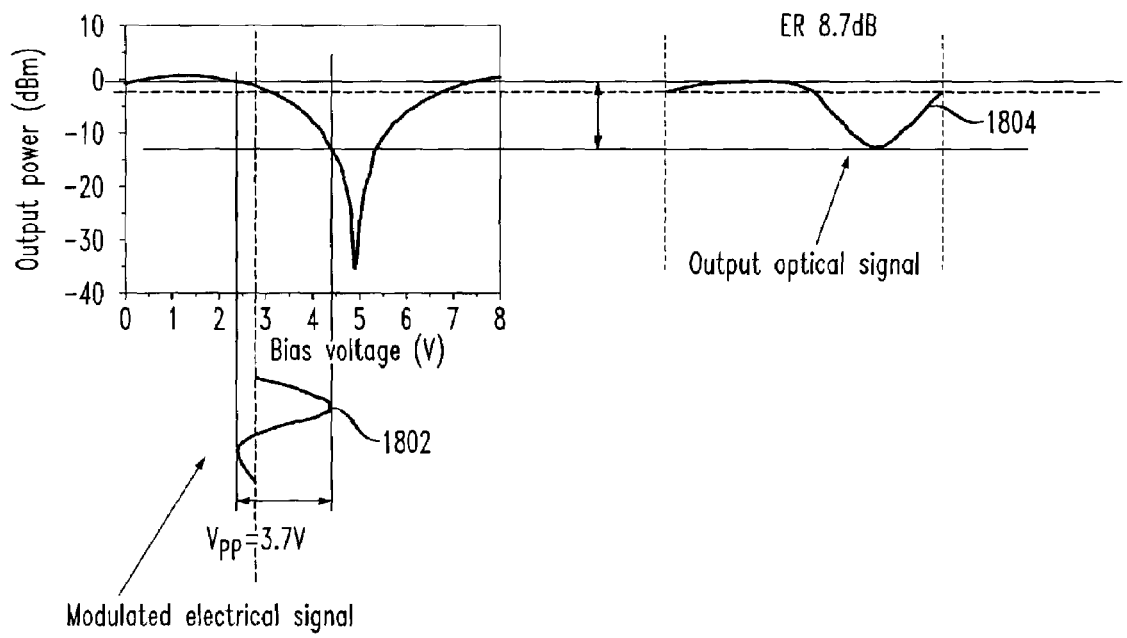
FIG. 18 illustrates obtaining a pre-distorted optical signal using a small amplitude distorted electrical signal in accordance with the invention.
Figure 19:
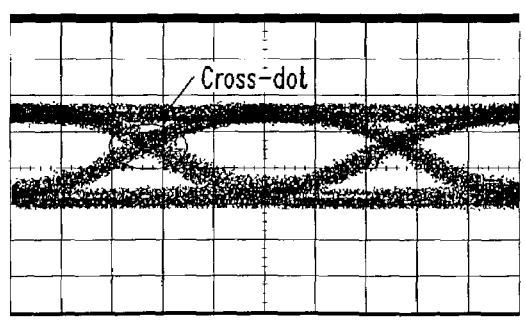
FIG. 19 illustrates an eye diagram for the pre-distorted optical signal of FIG. 18.

FIG. 18 illustrates how a pre-distorted optical signal is obtained from a distorted low amplitude electrical signal. In this case, a distorted electrical signal 1802 is asymmetric relative to the biasing voltage, e.g., 2.75 volts in the FIG. 18 example. A distorted electrical signal 1802 with a voltage of 3.7 $V_{pp}$ and a bias of 2.75 volts drives modulator 304 to obtain a pre-transmission distorted optical signal 1804. As shown in FIG. 18, the distorted shape of the input electrical signal passing through the transmission characteristic of the modulator 304 creates the pre-distortion of the first half of the optical signal 1804. The eye diagram of FIG. 19 further illustrates the pre-distortion. If the eye diagrams of FIG. 19 and FIG. 8 are compared, there is no obvious difference. Therefore, it may be assumed that a pre-distorted optical signal produced by either method of the present invention will act similarly when transmitted through an SSMF. The test results of FIG. 20 help to prove this assumption.

Figure 20:
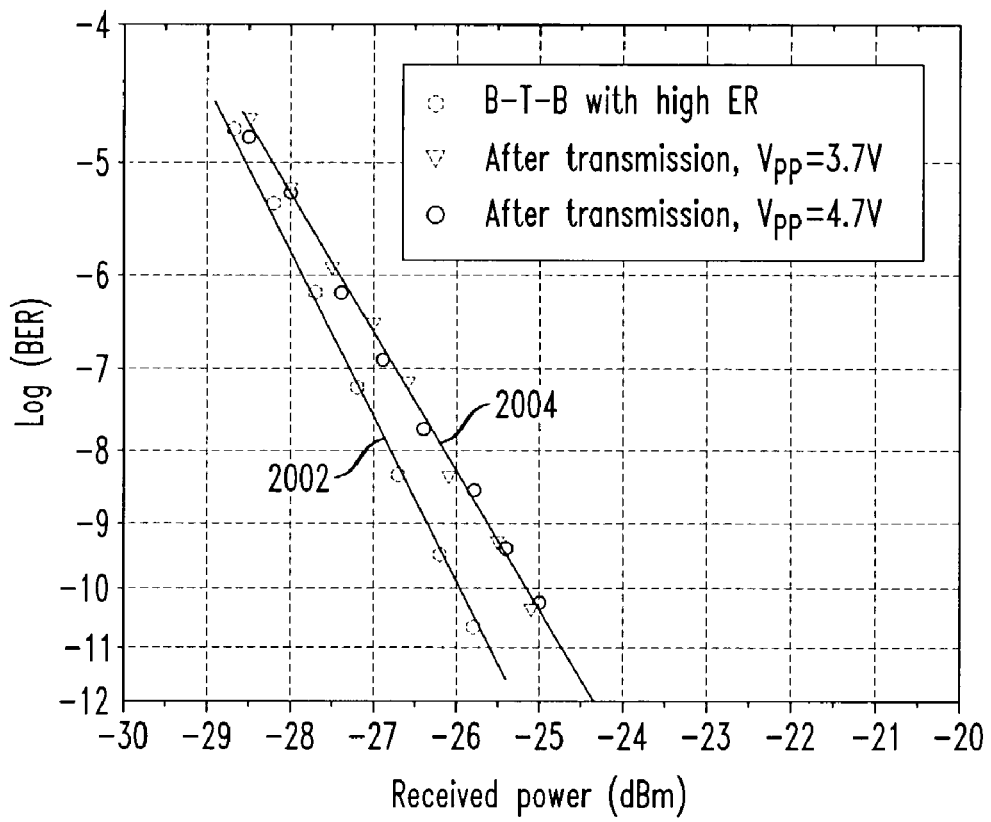
FIG. 20 is a BER versus received power graph illustrating that a pre-distorted optical signal obtained from a large amplitude electrical signal or from a small amplitude distorted electrical signal yield similar results.
Figure 21:
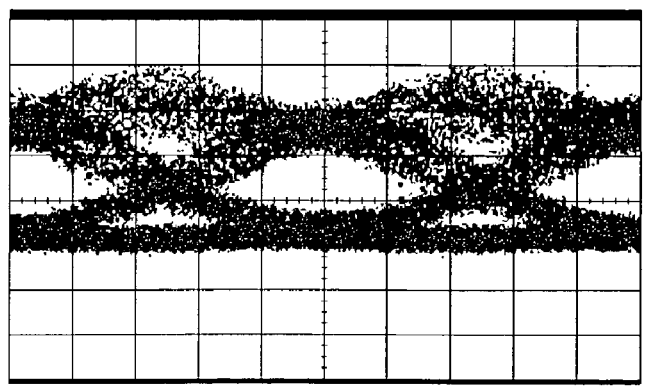
FIG. 21 illustrates an eye diagram for the pre-distorted optical signal of FIG. 18 after transmission.

FIG. 20 illustrates test results obtained by measuring the BER of system 300 using BER analyzer 310. The receiver sensitivity at a BER of $10^{-9}$ of a signal having a high ER of 13 dB and before transmission is −26.4 dBm, from curve 2002 of FIG. 20. The receiver sensitivity at a BER of $10^{-9}$ of a signal having an ER of 8.7 dB, after it is transmitted over a 100 km SSMF, is −25.6 dBm. Therefore yielding a penalty of 0.8 dB. The BER measurements of the transmission of a pre-distorted optical signal produced with a high amplitude electrical signal (circles) and with a distorted low amplitude signal (triangles) are virtually identical. In addition, after transmission, the eye diagrams of the two input signals are also similar. FIG. 21 illustrates an eye diagram after transmission. A clear and open eye diagram is obtained indicating good transmission results.

These results demonstrate that a distorted small amplitude electrical input signal can be used to obtain a pre-distorted optical signal instead of a large amplitude electrical signal, thereby saving power.

The benefits of using a combination of low ER, negative chirp, SPM and signal pre-distortion can also be demonstrated by analyzing test results obtained using the system 300 illustrated in FIG. 3. In addition to the features mentioned earlier, the system 300 uses a high power CW DFB laser (16.5 dBm), and a high sensitivity APD receiver instead of an EDFA and a TOF. Although input power is not adjusted in some implementations to optimize the benefits from SPM, the high power laser produces a launch power into the SSMF as high as 9-10 dBm, thereby producing some SPM and reducing the power penalty by 0.4-1 dB, compared to low powered cases. In addition, as mentioned earlier the modulator 304 has a chirp parameter of −0.7. Therefore the following test results include SPM and negative chirp. The system 300 of FIG. 3 also uses a high sensitivity APD receiver 308.

Figure 22:
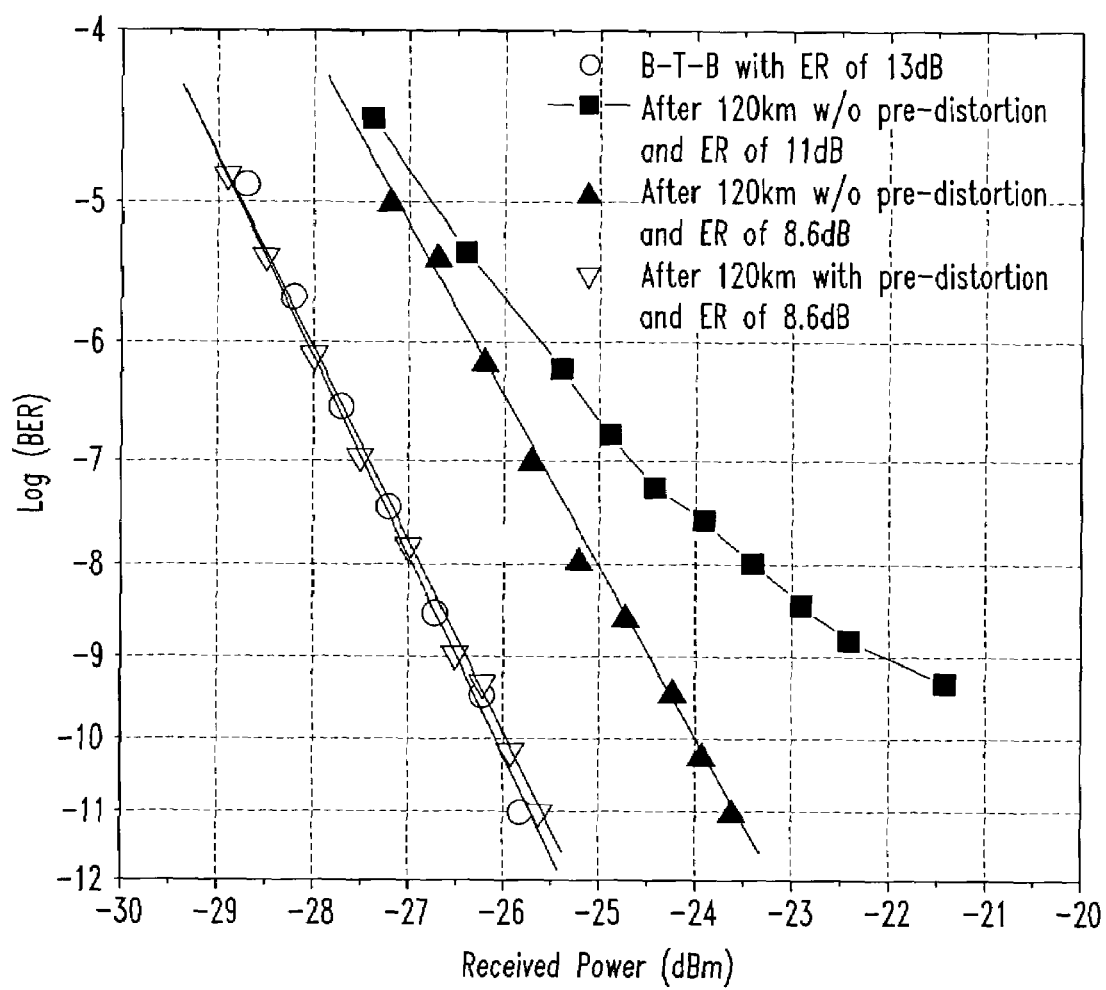
FIG. 22 illustrates the benefits of low ER and pre-distortion through a BER versus received power graph obtain from the system of FIG. 3.

FIG. 22 shows the BER performance for signal transmission over a 120 km SSMF for four different cases: (1) B-T-B with ER of 13 dB (circles), (2) after 120 km without pre-distortion and an ER of 11 dB, (3) after 120 km without pre-distortion and an ER of 8.6 dB and (4) after 120 km with pre-distortion and an ER of 8.6 dB.

Test results for the first case are taken before transmission on a signal with a high ER of 13 dB and without pre-distortion. The receiver sensitivity at a BER of $10^{-9}$ for this case is −26.4 dBm. The results of this case are compared with results after transmission. The three different after transmission cases mentioned earlier demonstrate the benefits of the present invention and, particularly, the use of signal pre-transmission distortion.

For the second case, i.e., an input signal with an ER of 11 dB and without pre-distortion, receiver sensitivity after transmission at $10^{-9}$ is −22 dBm. The power penalty for this case is over 4 dB and error floor is about $10^{-10}$. When the ER is increased to 13 dB, the error floor is increased to above $10^{-8}$ (curve not shown). Therefore, when considering long distance transmissions, raising the ER lowers receiver sensitivity. Thus, a high ER may not be suitable for 120 km transmission.

In the third case the ER is reduced to 8.7 dB and the signal is transmitted without pre-distortion. After transmission over 120 km, the receiver sensitivity at $10^{-9}$ is −24.4 dBm and the power penalty is 2 dB. Therefore the case with the lower ER has a lower power penalty.

In the fourth case the input signal is pre-distorted and ER is maintained at 8.7 dB. After transmission over 120 km, the receiver sensitivity at the BER of $10^{-9}$ is −26.3 dBm and the power penalty is 0.1 dB. Clearly, pre-distortion in combination with low ER, SPM and negative chirp effectively reduce power penalty by a significant amount.

Figure 23:
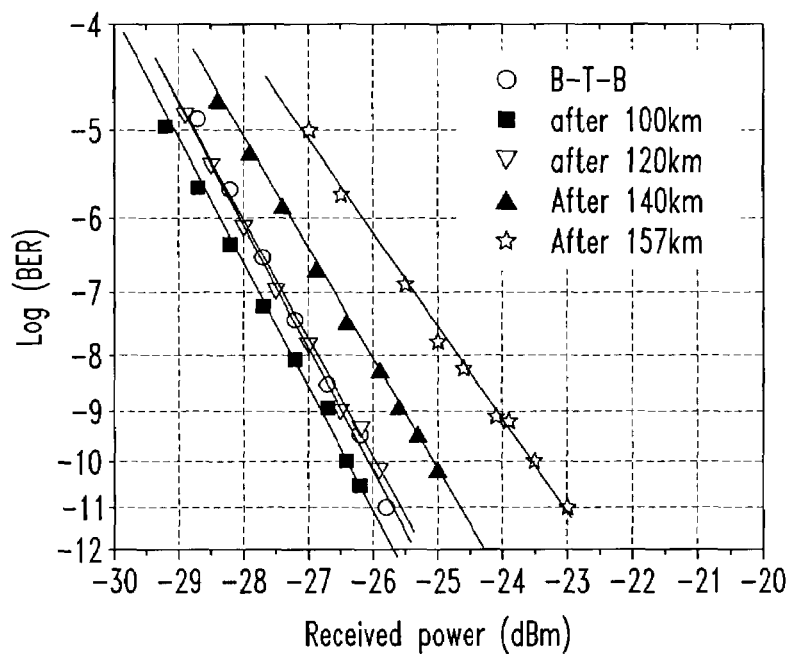
FIG. 23 illustrates BER versus received power results for different fiber lengths obtain from the system of FIG. 3.

The results from a second experiment measuring the BER performance of system 300 for various distances above 100 km is illustrated in FIG. 23. The BER results of the various distances are compared with a B-T-B signal with a high ER of 13 dB and without pre-distortion to determine approximate power penalties. As shown in FIG. 23, after the signal is transmitted over 100, 120, 140 and 157 km, the penalties are −0.4, 0.1, 1.1 and 2.4 dB, respectively. ER is optimized for each distance, and is 10.1, 8.7, 7.2, and 6.3 dB, respectively.

Figure 24:
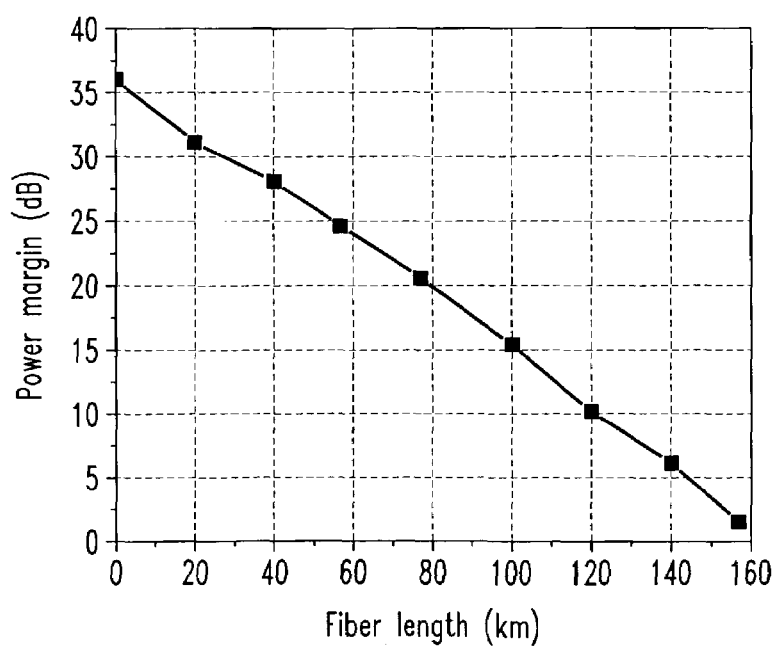
FIG. 24 illustrates a power margin versus fiber length graph obtained from the system of FIG. 3.

FIG. 24 illustrates the results of a third experiment measuring power margins at a BER of $10^{-9}$ versus transmission distance. After a signal is transmitted over 100, 120 and 140 km, the margins are 15.4, 9.8 and 6.2 dB respectively. The power margin decreases almost linearly despite the gradual increase of dispersion because launch power is increased by reducing the ER for optimum transmissions.

It is to be understood that numerous variations on the above described methods and apparatus are possible without departing from the scope of the invention.

What is claimed is:

1. A method of transmitting a data signal over an optical fiber, comprising:
    generating, from said data signal, an optical signal including a distorted version of said data signal, said step of generating an optical signal including intentionally distorting at least a portion of said data signal, the step of generating an optical signal including controlling the power of a laser supplying a laser signal to an optical input of an optical modulator to a power level suitable for use with self phase modulation, said optical modulator being used to perform an optical modulation operation that produces said optical signal;
    transmitting said optical signal over said optical fiber, at least some of the intentional distortion introduced into said data signal being corrected by the transmission properties of said optical fiber during said transmitting step; and
    wherein said step of generating an optical signal includes:
    using an electrical signal with a large peak to peak voltage and a symmetric shape to control the modulation of said data signal onto an optical signal by an optical modulator, said large peak to peak voltage being sufficiently large to cause said optical modulator to operate in a non-linear manner when modulating at least a portion of said data signal.

2. The method of claim 1, further comprising;
    controlling said optical modulator to operate with negative chirp when, modulating said data signal.

3. The method of claim 2, further comprising:
    controlling said optical modulator to operate with a low extinction ratio when modulating said data signal.

4. A method of transmitting a data signal over an optical fiber, comprising:
    generating, from said data signal, an optical signal including a distorted version of said data signal, said step of generating an optical signal including intentionally distorting at least a portion of said data signal, said step of generating an optical signal including:
        using an electrical signal with a large peak to peak voltage and a symmetric shape to control the modulation of said data signal onto an optical signal by an optical modulator, said large peak to peak voltage being sufficiently large to cause said optical modulator to operate in a non-linear manner when modulating at least a portion of said data signal;
        controlling the input power of a laser, supplying a laser signal to an optical input of said optical modulator, to a power level suitable for use with self phase modulation; and
        controlling said optical modulator to operate with negative chirp when modulating said data signal; and
    transmitting said optical signal over said optical fiber, at least some of the intentional distortion introduced into said data signal being corrected by the transmission properties of said optical fiber during said transmitting step.

5. The method of claim 4, further comprising:
    using an avalanche photo diode to convert the optical signal transmitted over said optical fiber into an electrical signal.

6. The method of claim 5, further comprising:
    using a high power laser to supply said laser signal to the optical input of said optical modulator.

7. An optical transmission method, the method comprising:
    modulating an electrical signal to generate an optical signal to be transmitted over a fiber, said step of modulating an electrical signal including using, in combination:
    i) negative chirp;
    ii) a low extinction ratio; and
    iii) a laser intensity sufficient to induce self phase modulation; and
    wherein said modulating an electrical signal includes supplying a symmetric electrical input signal to a modulation signal input of an optical modulator, the input signal having a peak to peak voltage large enough to cause said optical modulator to operate in a non-linear manner when modulating at least a portion of said electrical input signal on a laser signal thereby causing distortion of the generated optical signal.

8. The optical transmission method of claim 7, wherein said generated optical signal is an asymmetric optical signal resulting from said distortion.

9. The optical transmission method of claim 7, further comprising;
   operating an avalanche photo diode to detect the signal transmitted over said fiber.

10. The optical transmission method of claim 7, further comprising:
   operating a high power laser to generate a laser input signal to said optical modulator, said high power laser generating a laser signal having at least 20 milli-watts of power.

11. The optical transmission method of claim 10, further comprising:
   operating an avalanche photo diode to detect the signal transmitted over said fiber.

12. An apparatus for transmitting data over a standard single mode fiber, comprising:
   an electrical amplifier for amplifying an electrical version of said data;
   an optical modulator for receiving the amplified electrical version of said data and producing a distorted optical version of said data from said amplified electrical version of said data as a result of the amplitude of said electrical signal causing the modulator to operate in a non-linear manner when modulating at least a portion of said amplified electrical version of said data on a laser signal, said distorted optical version of said data being a laser signal that is supplied to an input of said standard single mode fiber; and
   a controller for controlling power of a laser supplying a laser signal to an optical input of said optical modulator to a power level suitable for use with self phase modulation.

13. The apparatus of claim 12, wherein an output of said optical modulator is coupled to said input to said standard single mode fiber and wherein the intensity of the laser signal output by said optical modulator causes self phase modulation during the transmission of said optical version of said data over the standard single mode fiber.

14. The apparatus of claim 12, wherein said laser is a high power laser.

15. The apparatus of claim 14, further comprising:
   means for controlling the distorted optical version of said data signal to induce negative chirp and to have a low extinction ratio during transmission over the standard single mode fiber.

* * * * *